April 13, 1965 G. MEYER-JAGENBERG 3,177,906
METHOD OF AND APPARATUS FOR DISPENSING
LIQUIDS, SUCH AS MILK OR THE LIKE
Filed Aug. 15, 1961 3 Sheets-Sheet 1

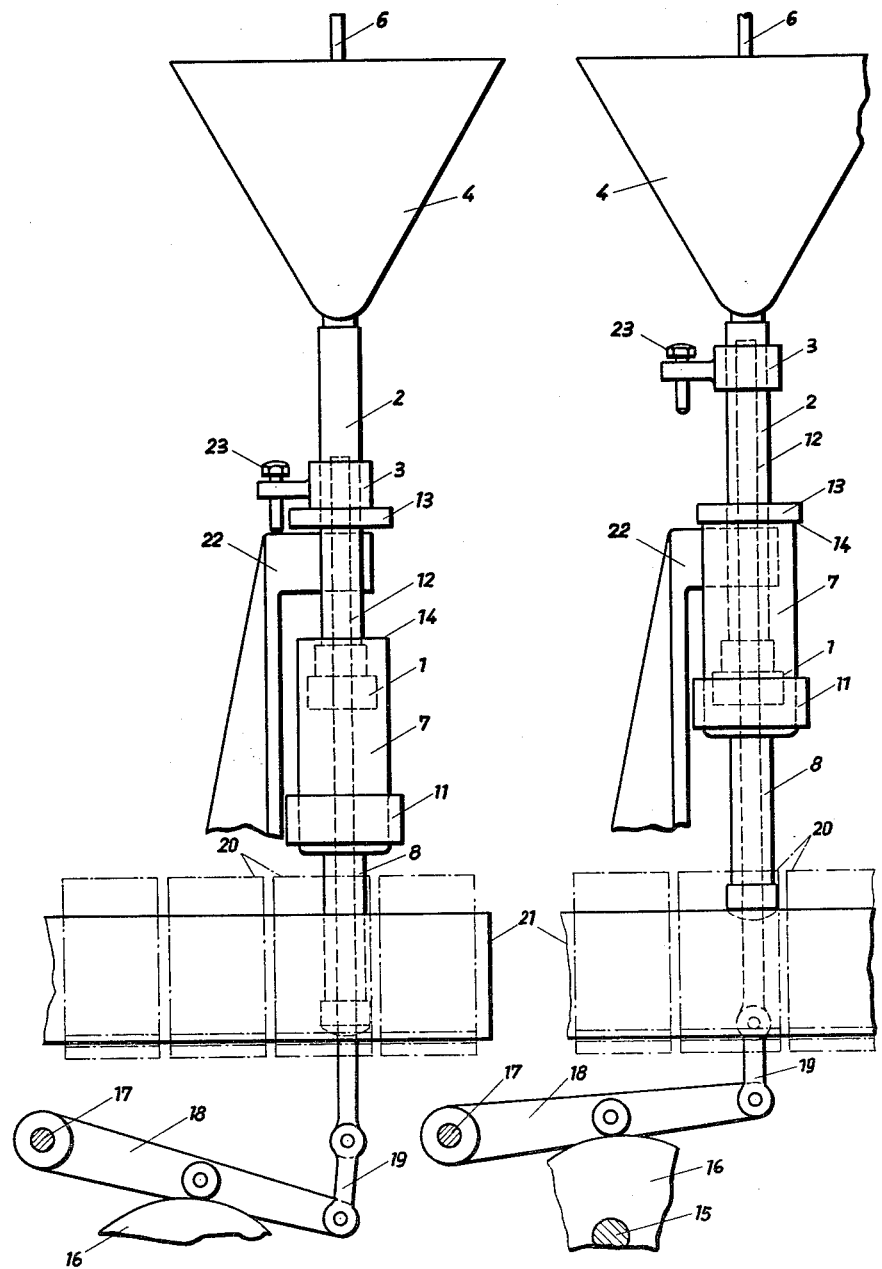

3,177,906
METHOD OF AND APPARATUS FOR DISPENSING LIQUIDS, SUCH AS MILK OR THE LIKE
Gunther Meyer-Jagenberg, Dusseldorf-Grafenberg, Germany, assignor to Jagenberg-Werke AG, Dusseldorf, Germany
Filed Aug. 15, 1961, Ser. No. 131,976
Claims priority, application Germany, Sept. 12, 1960, J 18,693
5 Claims. (Cl. 141—5)

The invention relates to a method of and apparatus for dispensing liquids, such as milk or the like, into receptacles by means of a device comprising a metering cylinder and a plunger.

In devices of this kind—i.e., in dispensers in which, through the agency of a plunger guided in a metering cylinder, liquid is brought from a supply vessel into the metering cylinder and thence conveyed to the receptacle to be filled at the rhythm of working—the usual procedure is that the exit aperture following the metering cylinder is placed near the opening cross-section of the said receptacle and the issuing stream of liquid is guided into such receptacle. In this method of working the free fall of the stream of liquid leads to considerable foaming, more particularly in the dispensing of milk. Such foaming impairs the quality of the liquid being dispensed and also impairs the accuracy of dispensing. Dispensing devices are known which comprise a filling tube dipping into the receptacle, the filling tube being withdrawn therefrom upon the completion of filling. In this method of working the filling tube continues to drip after it has been removed, a feature which is annoying and which makes dispensing inaccurate. Also, this kind of filling leads to considerable circulation of liquid and to continuously altering pressures and flows during dispensing, features which are very undesirable in the dispensing of milk.

According to the invention, to obviate these disadvantages it is proposed that, where liquids are dispensed through the agency of a device comprising a metering cylinder and a plunger, the distance between the rising level of the fill in the receptacle and the exit aperture delivering the liquid be maintained substantially constant during the filling step. Pressure and flow conditions therefore remain constant throughout the filling step, so that dispensing without foam and in accurate quantities is ensured. Another advantage of the procedure just outlined is that it ensures a high filling efficiency, a feature which is very important, more particularly where a dispensing device working in accordance with this method is used in semi-automatic or fully automatic machines. Extensive experiments with a variety of liquids and in a variety of dispensing conditions have shown that, when it is required to dispense liquids, such as milk or the like, which tend to foam, very satisfactory results can be achieved if the distance between the exit aperture and the level of the fill is maintained constant by the exit aperture dipping a few millimetres into the liquid—i.e., by such aperture lying a short distance below the level of the fill.

The relative movement between the plunger and the metering cylinder is controlled to provide this advantageous maintaining of the distance constant between the exit aperture and the said level, so that, by appropriate control of the movements of the various elements, a device operating along these lines can be adapted to different dispensing quantities and to different cross-sectional shapes of the receptacles being filled. The operation of the dispensing device comprising a plunger and metering cylinder is that, the plunger remaining substantially stationary, liquid is sucked out of the supply vessel by the downward movement of the metering cylinder and the metering cylinder exit aperture is introduced into the receptacle to be filled, the upward movement of the metering cylinder ejecting the liquid therein into such receptacle, while the exit aperture of the metering cylinder is withdrawn from the receptacle in dependence upon the rising level of the fill. According to another feature of the invention, the plunger, which remains stationary during the dispensing step, is raised together with the metering cylinder upon completion of the dispensing step, the amount by which the metering plunger is raised corresponding at least to the distance between the level of the fill and the top edge of the receptacle. The purpose of this extra stroke of the piston, which has no effect on dispensing, is merely to move the exit aperture away from the wall parts which project above the level of the fill, thus ensuring that an empty receptacle can be moved into the filling station, and the filled receptacle can be withdrawn therefrom, without any change in height of the receptacle.

The apparatus for carrying the method according to the invention into effect is so devised, and its individual elements are so disposed, that a substantially stationary plunger is connected to a supply vessel and is surrounded by a metering cylinder adapted to have its exit aperture introduced into the receptacle to be filled. The apparatus can be greatly simplified if the plunger in the metering cylinder is devised as a supply pipe for the liquid. The rising of the plunger is derived from the rising movement of the metering cylinder by the top edge thereof abutting an adjustable abutment on the plunger.

Another important feature of the invention is considered to be the overall arrangement of the various elements of the filling device, such arrangement being so devised that, from the supply vessel as far as the receptacle to be filled, all those parts of the device through which liquid passes are disposed coaxially of one another and vertically one above another. This arrangement helps to ensure simple and ready removal of air when the device is started up; also, the fact that the liquid-conveying parts of the device are disposed in a straight line helps the liquid to flow through without backing-up and without eddying.

For a better understanding of the invention and to show how the same may be carried into effect, reference may now be made to the accompanying drawings wherein:

FIG. 3 is a side elevation corresponding to FIG. 1;

FIG. 4 is a side elevation corresponding to FIG 2, and

FIGS. 5–10 diagrammatically illustrate various phases of the dispensing step.

Figure 1:
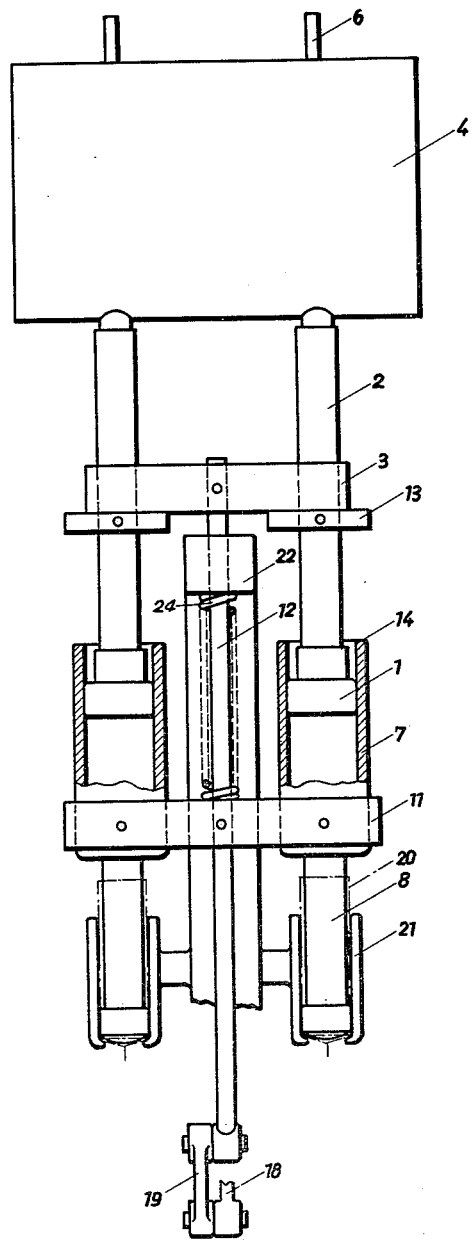
FIG. 1 is a front elevation of the apparatus.
Figure 2:
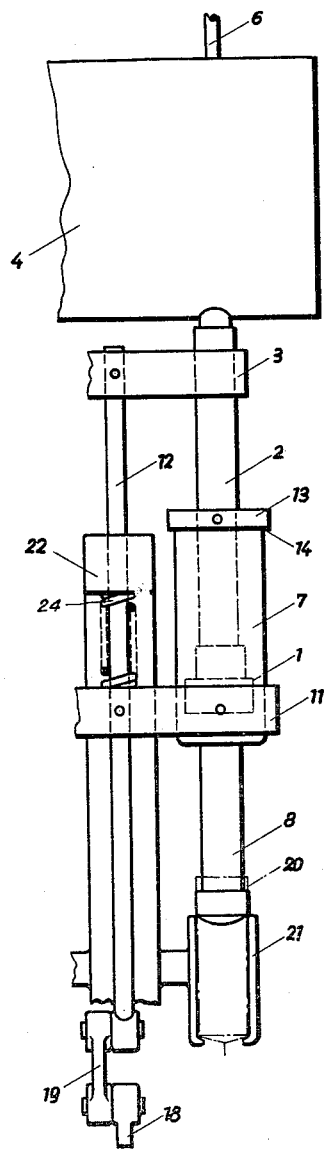
FIG. 2 illustrates a part of the apparatus shown in FIG. 1 but in a different operational position.
Figure 5:
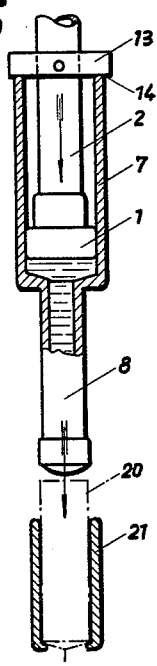

As will be apparent more particularly from FIG. 1, a dispenser, which in this embodiment is a double unit, comprises a plunger 1 which remains stationary during dispensing, the plunger 1 being connected to a plunger rod 2 slidable in a holder 3. The rod 2 takes the form of a hollow shaft and acts as a supply pipe for the liquid and is connected at the top to a supply vessel 4. Disposed in the plunger 1 is an inlet valve 5 formed by a spring-loaded ball. A rod 6 projecting from the vessel 4 is guided in the rod 2; the bottom end of the rod 6 rests upon the ball of the inlet valve 5, this arrangement serving for the removal of air from the dispenser.

Surrounding the plunger 1 is a metering cylinder 7 having an exit port 8. An outlet valve 10 is disposed near an exit aperture 9 in the port 8. The metering cylinder 7 is rigidly secured to a clamping member 11 which is secured to a vertically reciprocable guide rod 12. A stationary but adjustable stop ring 13 is provided on the rod 2 and is abutted by the top boundary edge 14 of the metering cylinder 7 at the cadence of operation. The system is driven by a cam 16 which is secured to a spindle 15 and which cooperates with a roller lever 18 pivotable around a stationary fulcrum 17. The free end of the lever 18 is connected by way of a link 19 to the bottom end of the guide rod 12 which slides up and down in a stationary guide 22. A receptacle 20 which it is required to fill is received in a guide track 21 in which empty receptacles are thrust into the filling position by means of a lifting track (not shown), being moved away from the filling station or position once they have been filled.

A spring 24 surrounds the guide rod 12 with the upper and lower ends of the spring bearing against the stationary guide 22 and clamping member 11, respectively. The spring 24 which is tensioned with the upward movement of the metering cylinder 7 serves for supporting by means of spring action the subsequent downward movement of such cylinder and thus presses the roller lever 18 against the peripheral face of the cam 16.

Figure 6:
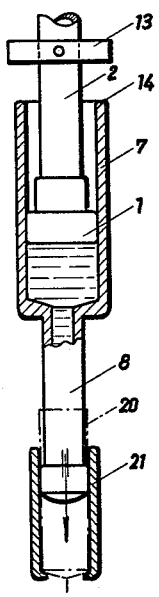
Figure 7:
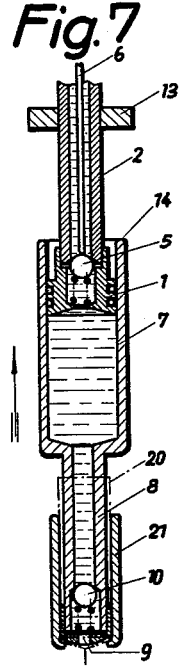
Figure 8:
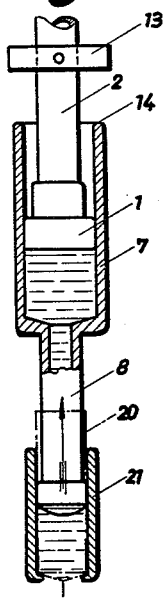
Figure 9:
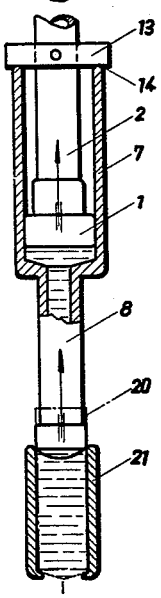
Figure 10:
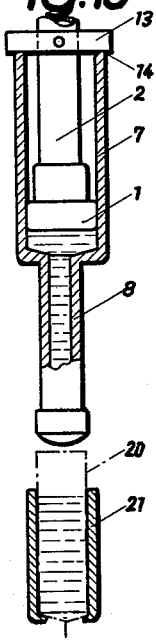

The operation of the dispenser will be described with reference to FIGS. 5-10 which illustrate various phases of the operation. Starting from the position shown in FIG. 5, the plunger 1 and metering cylinder 7 both descend until the descent of the plunger 1 is stopped by an adjusting screw 23, visible in FIGS. 3 and 4, abutting the stationary guide 22, the plunger 1 thereafter remaining stationary. As can be seen in FIG. 6, the metering cylinder 7 since it is secured to the guide rod 12 by the clamping member 11 continues to descend and the port 8 enters the receptacle 20, the metering cylinder 7 filling up with liquid. FIG. 7 shows the bottom end position of the metering cylinder 7; when the same has reached this end position, it is completely full and the exit aperture 9 is near the bottom of the receptacle 20. Referring now to FIG. 8, as the metering cylinder 7 starts to rise, the plunger 1 still remaining stationary, the liquid is ejected from the metering cylinder 7 until the same is completely empty as shown in FIG. 9. The metering cylinder 7 rises because, throughout the dispensing step, the exit aperture 9 is disposed in, or a short distance below, the plane of the rising level of the fill. When all the liquid has been introduced into the receptacle 20 from the metering cylinder 7, the further rising movement thereof leads to the top edge 14 abutting the stop ring 13, so that the plunger 1 and cylinder 7 perform an excess movement together, the amount of such movement corresponding to the length of those parts of the wall of the receptacle 20 which extends above the level of the fill. The receptacle 20 which has just been filled in the manner hereinbefore described can now be conveyed onwards and transferred to a closing device (not shown), while another empty receptacle 20 can be moved into the filling station and a further cycle of events started.

What I claim is:

1. A method of filling containers with liquid subject to foaming, comprising moving a metering cylinder having a discharge opening and a plunger therein downwardly, holding said plunger stationary while continuing the downward movement of the cylinder thereby simultaneously introducing the discharge opening into the container to be filled and drawing liquid into the cylinder, and moving the cylinder upwardly relative to the stationary plunger thereby simultaneously ejecting the liquid contained in the cylinder through the discharge opening and withdrawing the discharge opening from the container as the level of the liquid rises.

2. The method as claimed in claim 1 including the further step of moving said cylinder and plunger upwardly together an amount corresponding at least to the distance between the liquid level and the upper edge of the container after completion of the filling.

3. An apparatus for filling containers with liquid subject to foaming, comprising a vessel adapted to contain a supply of liquid, a hollow rod connected to the vessel, a plunger carried by the rod as its end remote from the vessel, said plunger having an outlet, valve means for controlling said outlet, a metering cylinder in which said plunger is mounted, said cylinder having a discharge opening in the end thereof, valve means for controlling the discharge opening, means operably connected to said metering chamber for moving said cylinder and plunger downwardly, means on the rod for stopping the downward movement of the plunger while the cylinder continues its movement and enters a container to be filled whereby the liquid flows through the hollow rod, past the valve means, the outlet and fills the metering cylinder, and further means for moving the cylinder upwardly relative to the stopped plunger whereby the plunger forces the liquid from the cylinder past the valve means and through the discharge opening into the container with the discharge opening moving out of the container with the rising level of the liquid.

4. The filling apparatus as claimed in claim 3 including adjustable stop means on the hollow rod adapted to be engaged by the upper end of the cylinder during the upward movement of the cylinder for moving the plunger with the cylinder an amount corresponding at least to the distance between the liquid level and the upper edge of the container after the completion of the filling.

5. The filling apparatus as claimed in claim 3 in which said rod, plunger and metering cylinder are disposed coaxially and arranged vertically one above another for achieving an easy venting and a straight line passage of the liquid from the vessel to the container to be filled.

References Cited by the Examiner
UNITED STATES PATENTS

| | | | |
|---|---|---|---|
| 223,522 | 1/80 | Locke | 141—374 XR |
| 1,686,811 | 10/28 | Greenhouse | 141—5 |
| 1,881,783 | 10/32 | Mallinckrodt, et al. | 141–5 XR |
| 2,724,535 | 11/55 | Day et al. | 141—275 |
| 2,764,333 | 9/56 | Schnehain | 141—275 XR |
| 2,936,005 | 5/60 | Wilckens et al. | 141—260 |
| 2,965,141 | 12/60 | Hoyer | 141—284 XR |
| 3,097,671 | 7/63 | Bonetti et al. | 141—302 XR |

LAVERNE D. GEIGER, *Primary Examiner.*
LOUIS J. DEMBO, *Examiner.*